US009660988B2

(12) United States Patent
Andrews et al.

(10) Patent No.: US 9,660,988 B2
(45) Date of Patent: *May 23, 2017

(54) IDENTIFYING PROTECTED MEDIA FILES

(71) Applicant: Amazon Technologies, Inc., Reno, NV (US)

(72) Inventors: Colin Andrews, Alameda, CA (US); Aleksey Sergeyevich Perfilov, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,099

(22) Filed: Aug. 3, 2015

(65) Prior Publication Data

US 2015/0341355 A1 Nov. 26, 2015

Related U.S. Application Data

(63) Continuation of application No. 13/472,742, filed on May 16, 2012, now Pat. No. 9,100,245.

(51) Int. Cl.
*H04L 29/06* (2006.01)
*G06F 17/30* (2006.01)
*G06F 21/10* (2013.01)

(52) U.S. Cl.
CPC ...... *H04L 63/0876* (2013.01); *G06F 17/3074* (2013.01); *G06F 17/30339* (2013.01);
(Continued)

(58) Field of Classification Search
CPC .......... H04L 29/06836; H04L 63/0428; G06F 21/6218; G06F 17/30097; G06F 17/30109
(Continued)

(56) References Cited

U.S. PATENT DOCUMENTS 8,396,841 B1 * 3/2013 Janakiraman ......... G06F 3/0608
707/692
8,442,994 B1 * 5/2013 Chen ................. G06F 17/30864
707/711
(Continued)

OTHER PUBLICATIONS

U.S. Non Final Office Action dated Jun. 16, 2014 (U.S. Appl. No. 13/472,742).
(Continued)

*Primary Examiner* — Hadi Armouche
*Assistant Examiner* — Hee Song
(74) *Attorney, Agent, or Firm* — Hogan Lovells US LLP

(57) ABSTRACT

A user can have media files associated with a user account in a shared resource environment, enabling the user to access those files from multiple devices and locations. Instead of uploading each file, a process can scan the files to determine corresponding copies already stored to the shared resource environment, which can be associated with the user account without uploading another copy. In cases where encryption or other protection prevents the content of a file from being verified, a fingerprint of unencrypted records of the file can be generated and compared against an index of fingerprints for previously encountered files. If the fingerprint matches information stored for a media file, and the fingerprint meets at least one validity criterion, a copy of the media file can be associated with the user account even though the user's copy cannot be read, or potentially even played, by a component of the environment.

15 Claims, 5 Drawing Sheets

(52) U.S. Cl.
CPC ........ *G06F 21/10* (2013.01); *H04L 29/06836* (2013.01); *H04L 63/0428* (2013.01); *H04L 63/123* (2013.01); *H04L 63/102* (2013.01)

(58) Field of Classification Search
USPC ......... 726/4, 21, 27; 713/153, 176; 709/213; 707/770
See application file for complete search history.

(56) References Cited

U.S. PATENT DOCUMENTS

| | | | | |
|---|---|---|---|---|
| 8,904,120 | B1* | 12/2014 | Killamsetti | G06F 13/00 707/692 |
| 9,069,786 | B2* | 6/2015 | Colgrove | |
| 9,100,245 | B1 | 8/2015 | Andrews | |
| 9,251,160 | B1* | 2/2016 | Wartnick | G06F 17/30159 |
| 2009/0259623 | A1* | 10/2009 | Mooneyham | G06F 17/30038 |
| 2010/0262618 | A1* | 10/2010 | Hedinsson | G06F 17/30053 707/770 |
| 2011/0083167 | A1* | 4/2011 | Carpenter | G06F 17/30563 726/4 |
| 2012/0110323 | A1* | 5/2012 | Colclasure | G06F 17/30106 713/153 |
| 2012/0166403 | A1* | 6/2012 | Kim | G06F 17/30156 707/692 |
| 2012/0197966 | A1* | 8/2012 | Wolf | H04N 21/23424 709/203 |
| 2012/0324495 | A1* | 12/2012 | Matthews, III | H04H 60/372 725/14 |
| 2013/0006951 | A1* | 1/2013 | Yu | G06F 17/30784 707/706 |
| 2013/0226876 | A1* | 8/2013 | Gati | G06F 17/30079 707/652 |
| 2013/0290465 | A1* | 10/2013 | Harrison | G06F 17/30902 709/213 |
| 2013/0305039 | A1* | 11/2013 | Gauda | G06F 21/6218 713/153 |

OTHER PUBLICATIONS

U.S. Final Office Action dated Dec. 18, 2014 (U.S. Appl. No. 13/472,742).
U.S. Notice of Allowance dated Apr. 8, 2015 (U.S. Appl. No. 13/472,742).

* cited by examiner

IDENTIFYING PROTECTED MEDIA FILES

CROSS-REFERENCE TO RELATED APPLICATIONS

This application claims priority to U.S. patent application Ser. No. 13/472,742, filed May 16, 2012, and entitled "Identifying Protected Media Files" which is a Non-Provisional U.S. Patent Application of a U.S. Provisional Patent Application Ser. No. 61/596,588, filed Feb. 8, 2012, and entitled "Finger Printing for DRM Files," which are incorporated herein by reference for all purposes.

BACKGROUND

Users are increasingly turning to electronic media, such as MP3 format music files, downloadable video files, streaming media content, and the like. Since users often utilize multiple electronic devices to access this media, users are turning to the cloud to store their media files. As an example, a user can upload the user's electronic music collection to a remote database offered by a cloud provider, and can then access that music collection using any appropriate electronic device capable of connecting with the remote database and supporting a format of the media. Such an approach has certain deficiencies, however. For example, a user must upload a copy of all the user's media files, which can be quite large and thus can take up a lot of time and bandwidth. Further, certain media providers utilize proprietary formats or information that prevent the files from being supported by other content providers or media systems, such that users are unable to have their entire media catalog stored and accessible from a single location unless the user only purchases from a specific provider.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to managing media files in an electronic environment. In particular, various embodiments described herein enable users to have media files added to a personal account or library stored in a shared resource environment, such as the cloud, without having to upload each individual media file. Further, approaches discussed herein can recognize and support media files with proprietary formatting or protection that otherwise may not be supported using conventional approaches. Various algorithms can analyze fingerprints of a media file, such as may include records that are encrypted but unique to a particular instance of content, and correlate the fingerprints with known media files. In such a situation, a user having a licensed (or otherwise valid) copy of a media file can have the media content of that file added to a personal account without having to upload that file or purchase a copy of that file in a format that is supported by the shared resource environment.

Various other functions and advantages are described and suggested below as may be provided in accordance with the various embodiments.

Figure 1:
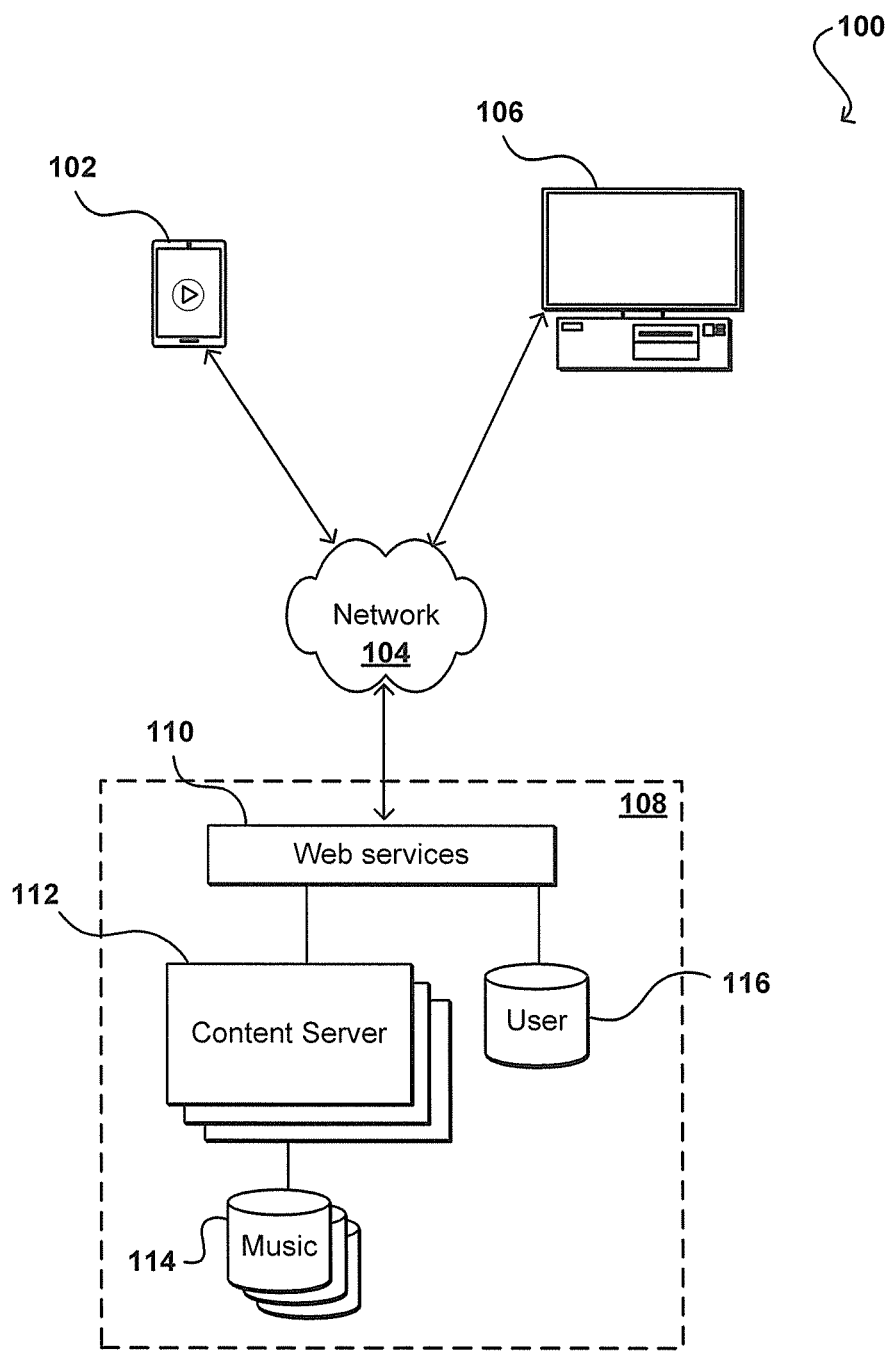
FIG. 1 illustrates an example environment in which aspects of the various embodiments can be implemented.

FIG. 1 illustrates an example environment 100 in which aspects of the various embodiments can be implemented. In this example, a user has two client devices 102, 106 that are able to play media content, such as audio files, video files, and the like. Although a tablet computer 102 and desktop computer 106 are shown in this example, it should be understood that the client devices can include any number and type of appropriate devices, as may include electronic book readers, smart phones, notebook computers, personal data assistants, video gaming consoles, television set top boxes, smart televisions, and portable media players, among other such devices. As discussed above, the user might like to be able to play a media file, such as an MP3 format music file, on either of the client devices in the figure. Using a conventional approach, the user would have to cause a copy of the media file to be stored on each device, which in some situations can cause the user to have to purchase two separate copies in order to comply with licensing restrictions or other such limitations.

With the availability of network or "cloud"-based storage, a user is able to upload or otherwise transfer a copy of the media file across at least one network to a resource provider environment 108. The network 104 can include any appropriate wired or wireless network, such as the Internet, a cellular network, a local area network (LAN), and the like. In at least some embodiments, the resource provider environment 108, which can be a distributed system with components in one or more locations in various embodiments, can include a Web services layer 110 or similar set of components configured to receive requests, such as Web service requests to a plurality of user-exposed APIs, and direct information for those requests received to one or more appropriate components for processing. A Web services layer can include any number and type of components known or used for such purposes, such as may include one or more Web servers, routing components, load balancers, and the like. When a user submits a request to add a media file to a user account, a component of the Web services layer (or other component of the provider environment 108) can check a user data store 116 or other data source to verify that the user has an account with the provider or is otherwise authorized to store content to the provider environment. Any appropriate validation or authentication can be utilized as is known for such purposes. In some embodiments, a user can be authenticated once to initiate a session and then can receive a token to be submitted with subsequent request on the session to avoid repeated authentication for each request. Once the user is determined to be able to store media to the environment, a content server 112 or other appropriate component can cause the media file to be stored to an appropriate location, such as one of a set of data stores 114.

When the media file is stored to one of the media data stores 114, a user can be able to access that media file from either of the client devices 102, 106 across the network 104. In some embodiments, the user is able to download a copy of the media file to either of the devices 102, 106, or another appropriate device, up to a maximum number of copies allowed by any license associated with the media file. In other embodiments, a user is able to maintain a single copy in the data store 114 (and potentially other copies elsewhere) and "stream" that media file to any electronic device capable of receiving content across a network and presenting that content to a user. "Streaming" as used herein refers to a process whereby media content is transferred in near-real time, typically in response to a request for the media content. The media content is able to be viewed, played, or otherwise accessed while at least a portion of the content is still being transferred. Buffering can be utilized, and an amount of data might have to be buffered for the media file to be accessible, as is known for streaming media. The media can be played through a browser application, media player application, or other such module or component. In some embodiments the media might be accessible only on certain devices, while in other embodiments a user can access the media file from any computing device capable of accessing media files through a Web browser or similar application. Such an approach is beneficial in at least some embodiments, as the approach can comply with a number of copies restriction under a license, and an prevent the user from having to store copies of each media file on each device with which the user wishes to access the content.

As discussed, however, such an approach can still require a user to upload each media file to a provider environment 108, which can be time consuming and can require a significant amount of bandwidth, particularly for large media files such as high definition movies. In order to prevent the need to upload each individual file, and thus improve the user experience, approaches in accordance with various embodiments can scan or otherwise analyze the media files that the user would like to add to an account before the user uploads those files, and if a copy of that file is already stored in the provider environment that file can be added to a user account without requiring the user to upload his or her copy of the file.

Figure 2:
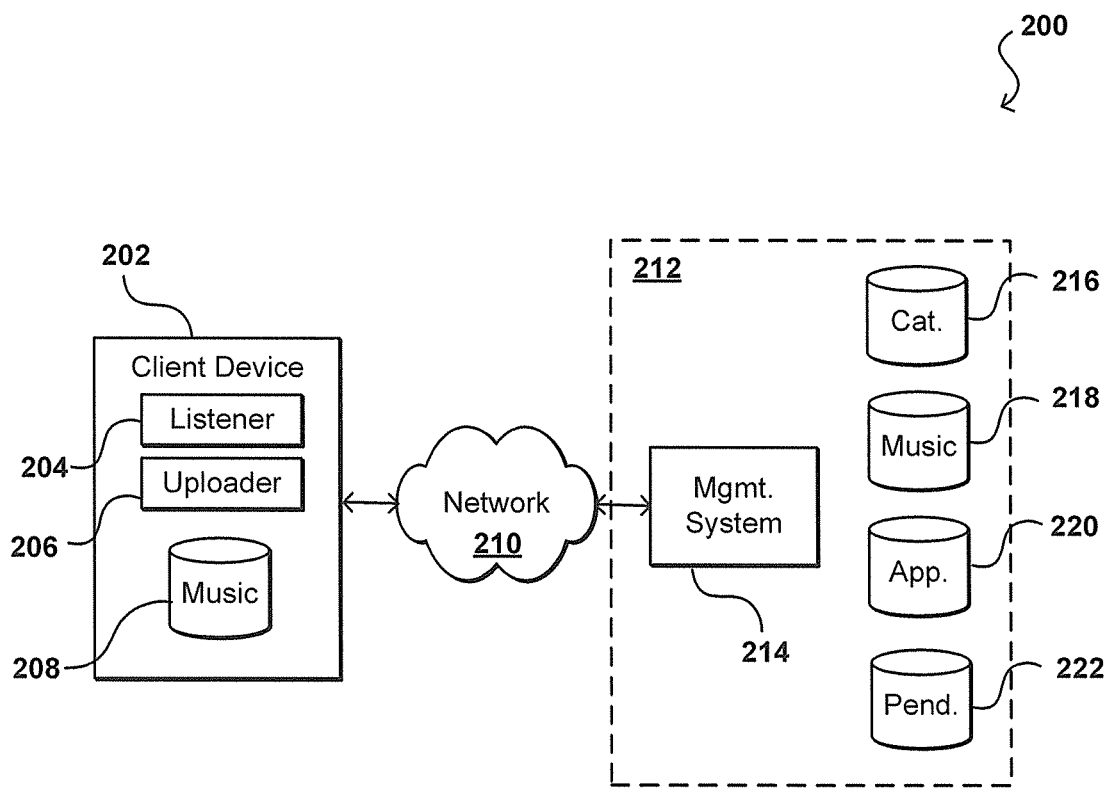
FIG. 2 illustrates an example environment including components for implementing aspects of various embodiments.

For example, FIG. 2 illustrates an example situation 200 wherein a user would like to upload a set of media files to be stored in a data store 218 of a cloud provider environment 212. In this example, the user's media files are stored in a local data store 208 on a client device 202, although it should be understood that the media files could be stored on a local server, external media, or other such location. In this example, the user can access an uploader application 206, which can be supplied by the content provider or a third party. In some embodiments the uploader is a standalone application, while in other embodiments the uploader can be a plugin to a media player or a script executable on a Web page, among other such options. In various embodiments, a user can indicate to the uploader one or more media files to be added to the user's account. A listener component 204, which can be part of, or separate from, the uploader 206, can analyze each media file to be added to the user account to attempt to identify the media file. In at least some embodiments, if the listener is able to identify a media file, the listener (or uploader, or other such module or component) can contact a media management system 214 or other such component of a provider environment 212 to determine whether the provider environment has a copy of the file stored in a media data store 218 or other such location. If a copy of the media file is stored in the media data store 218, an identifier can be associated with a user account with the provider, such that the user can access the media file from the provider environment without having to upload the user's copy of the media file from the computing device 202. The management system can include, or be associated with, modules or services for providing portions of the functionality. For example, the management system can utilize a metadata match service to search the provider files (e.g., catalog) to locate identifiers for media files stored in the provider environment, as well as a fingerprint matching service for matching fingerprints with specific media files, as discussed later herein.

In order to identify a media object, various embodiments can analyze metadata stored in unencrypted portions of the object, or otherwise associated with the object. When a user indicates that the user wants to upload a media file, a listener or other such component can determine the format of the contents of the media file and can obtain metadata useful for identifying the file. When the listener is able to obtain the information, the listener can provide this information to a component (on the local device or a remote device) that is able to perform a look up against a data store 216 that includes information for each media file stored and/or offered by the provider, such as may be offered for consumption (e.g., purchase, rent, or download) from an electronic marketplace or content provider. If information such as a title, artist, and other such information match a media file in the catalog, or a media file stored in another location of the provider environment, and the content of the media file is determined to correspond to the information, the file can be associated with the user's account and the user can be able to access that media without uploading the file. It should be understood that the media files can include identifiers, security mechanisms, watermarks, or other information that can help to determine an authenticity of a copy and/or whether the copy is an authorized copy in which the user has access rights. Various other types of information can be contained in the records or fields of a media file as well, and the selection of information used for matching can vary between embodiments, and can depend upon factors such as the type of media, format of the media object, etc.

In at least some embodiments, a content provider environment can utilize at least one fingerprinting process to attempt to assist in identifying media files and/or verifying an authenticity of those files. As discussed, a format can include records or fields of certain types of information for certain types of files. For a given format and type of file, for example, a certain selection of information can be utilized in a particular order to generate a fingerprint of that file. For example, a given content provider will likely utilize the same ordering and selection of record information for a media file over at least a period of time, whereby each user obtaining a copy of that media file with obtain the same record information. Each time a listener sees one of those files, the records should be substantially the same (unless tampered with or modified), such that a fingerprint generated using a specific selection of the records in a specific order should be the same for each of those copies. When a media file is located and a fingerprint determined for that file, that fingerprint can be compared against fingerprints in an approved fingerprint index 220, or other such location, where a fingerprint has been associated with information for a media file that has a copy in the provider environment, or at least has been identified even if the provider environment does not include a copy. A media file can include information such as artist and title that can readily be matched against catalog data, such that it can be relatively straightforward to determine whether a file matches an item in the catalog. The fingerprint for such a file can be stored to the index with information about that file, such as through a key value pair. When that fingerprint is subsequently determined for another copy of the file for another user, a comparison against the approved fingerprint index can quickly enable that media file to be identified.

As mentioned, however, certain media and content providers use proprietary information formats or encryptions that can prevent information about a media file from being readily determined. In at least some embodiments, the proprietary information can also prevent the media from being accessed outside certain applications. For example, the information in the records can be encrypted such that, even though the information can be seen, it is not possible to determine what is contained in those records. The inability to decrypt portions of the file can prevent licensing, content, security, format, and other such information from being determined, which can prevent the files from being playable from a conventional application.

Because the information in the media file records can still be viewed, however, a unique fingerprint can still be generated for each media file. The encoded records themselves will be unique for a given file, as the information even when encrypted will be different than the encrypted information for any other file. Accordingly, approaches discussed herein can still generate fingerprints using a selection and ordering of record information for a file, even if the actual values of those records cannot be determined without ability to decrypt the records. These fingerprints can be used to compare against fingerprints for other media files in the provider environment to determine if there is a match, such that the file does not need to be uploaded. A problem still remains, however, in the fact that the system cannot determine the information in the file to be able to verify a content of the file. In many cases, users can modify metadata associated with a file, such that the user can cause a file to appear to contain something different than what it actually contains. If the system matched using only metadata, for example, a user could keep using the same file with different metadata each time to add media to their account without actually having possession of those different media files.

In some instances, the media content of a file may be protected using an encoding algorithm, such that an analysis of the actual content cannot be performed. For unencoded media files, for example, the media content can be analyzed to generate a signature or fingerprint. Then, when another media file is received that purports to include the same content, analysis of the media content can confirm whether or not the content is the same. When the media portion is encrypted, however, such a confirmation process cannot be used with any level of success.

In formats such as the MPEG-4 format, a file is required to have a record that enumerates the sizes of the encoded audio and/or video sample records within the audio and/or video stream. These records are referred to as "stsz" atoms. The "stsz" atoms can be up to 150 k in length, but average 40 k-45 k in length for an audio file, with the length being related to the length of the file. The values in these records are unique to a particular encoding of a particular file. They can be used to fingerprint the audio and/or video data in the file as encoded before encryption, such as digital rights management (DRM) encryption, was applied.

In at least some embodiments, a cryptographic hash of the values in these record can be used to uniquely identify a media file. The hashing algorithm used can be any appropriate hashing algorithm, such as a SHA-1, SHA-256, MD5, or HMAC algorithm. These hashes can serve as fingerprints that can be added to a sample table or pending index, as discussed elsewhere herein. While the information in a fingerprint is unique to a particular file and encoding, it does not by itself contain the information necessary to match the file with the media files stored in the provider environment.

Approaches in accordance with various embodiments can attempt to map these fingerprints to specific media files by generating an index that maps specific fingerprints to files in the provider environment. In at least some embodiments, the metadata for a media file can be utilized the first time a fingerprint is seen by the provider system, as well as potentially a number of additional times. For example, a new fingerprint can be stored to a "pending" index 222 with information from the metadata, such as title information. In some embodiments a user can have this media file added to the account even when the information has not been verified, while in other embodiments a verification process might have to approve the match before the file can be added to a user account. A balance can be made between providing a good user experience for trustworthy users with the ability of untrustworthy users to manipulate the system. As discussed later herein, accounts can periodically be scanned to determine whether content was added that was not authentic, in which case the system can be configured to remove that content from the user account.

In some embodiments, a fingerprint can be determined to be valid for a specific media file when that fingerprint occurs at least a minimum percentage of the time in files alleging to include the identified media. For example, if a fingerprint occurs at least 10% of the time a copy of a specific media file is scanned, the system can assume that the fingerprint is valid can match the file with a file stored by the provider. If a fingerprint occurs less than that amount of time, the system might force the user to upload their copy to add it to their account, in order to ensure that the user has access to the proper file. For example, the file might include a rare audio and/or video file that is not stored by the provider environment, but the provider might still want the user to be able to access that file from the cloud. If the file is protected with DRM or another such technology that enables the file only to be played from a particular device, for example, there might be little advantage for the user to upload the file as the file will not be able to be played from the provider environment. For other types of files, such as podcasts, which typically would not be protected using DRM or a similar approach, and which a provider might be unlikely to store, the user can be forced to upload a copy of each of those files if the user wants those files to be playable through the provider system, in at least some embodiments.

The fingerprint index can be generated using the metadata tags in the media files scanned by the uploader. The metadata can be used to identify a corresponding item in the provider catalog, for example, by comparing metadata values such as artist, album, track number, disc number, title, and track duration with the corresponding data in the catalog. The fingerprint from a file then can be associated with an item identifier that matches the metadata. Each item identifier can have a list of all the fingerprints that have been matched to that identifier. Each fingerprint also can have associated with it the number of unique times the fingerprint has been seen in customer files.

When a fingerprint meets specified validity criteria, the fingerprint can be considered to be a valid fingerprint that corresponds to a real version of a media file that was purchased from a legitimate source. The fingerprint can be added to the index that maps valid fingerprints to media identifiers in the catalog. The index can be used to grant matches for encrypted media files scanned by the uploader. Over time, if additional fingerprints are seen for a given item identifier that meet the validity criteria, those fingerprints can be added to the index to match the media identifier. The parameters and the heuristic of the validity criteria can be tuned to adjust the match coverage or scope of fraud at any time.

In order to increase the coverage of the index, an initial sampling phase can be conducted where fingerprints and metadata are collected from files on customers' computers. In some embodiments no matches may be granted, as only the counts of fingerprints encountered and the associated media files are updated. In one embodiment a sampling period can be conducted until a minimum number (e.g., at least 90%) of the media files scanned have at least a minimum number (e.g., 10) of instances with the same fingerprint. At the end of the sampling period, all fingerprints that met the validity criteria can be inserted into the approved or main index for matching.

Since there will likely be a number of unusual, but valid, media files that would not be seen during the initial sampling phase, and as new media files will continue to be produced, approaches can enable the system to have the ability to update the set of valid media files as more files are scanned. As more unique files are scanned by the system, the associated fingerprints can be added to the counts of fingerprints encountered. The counts can be updated in the main index or in a training index used to determine which fingerprints are valid and should be contained in the main index. Such an approach enables the system to "learn" which fingerprints represent valid files sold by, or otherwise obtained from, a legitimate source. In some embodiments more stringent validity criteria might be used once the matching feature is performing adequately, in order to reduce the scope of fraud.

Figure 3:
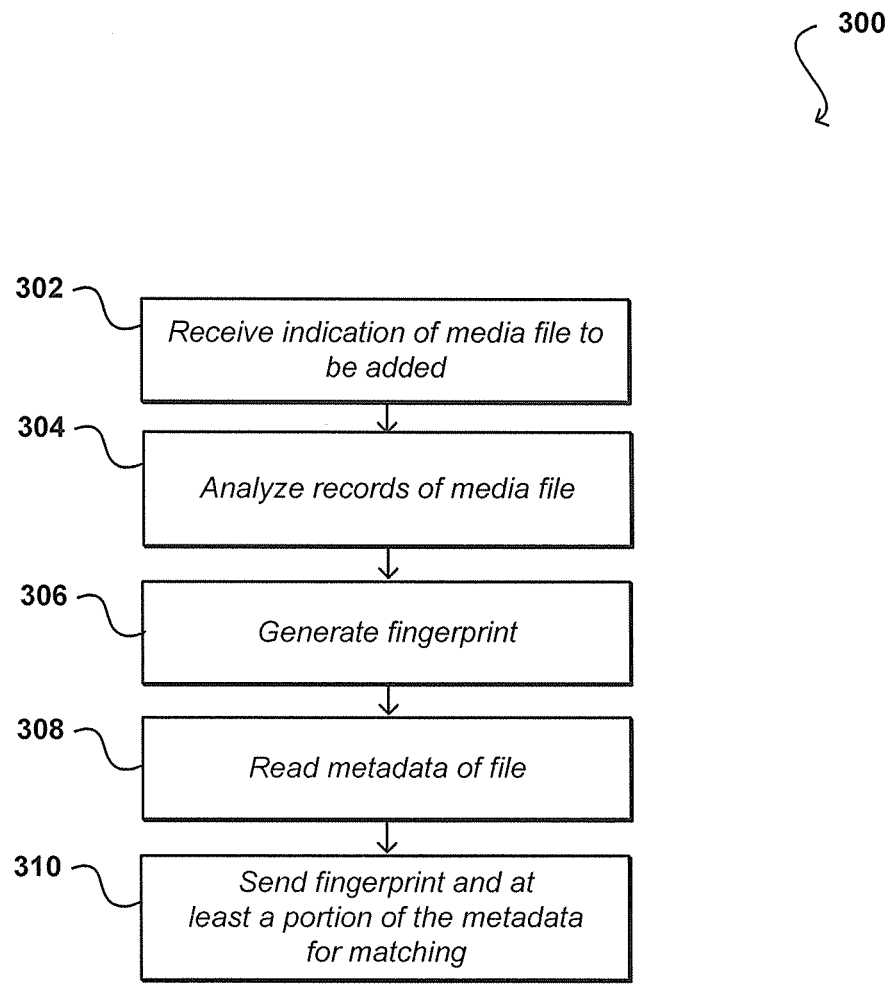
FIG. 3 illustrates an example process for adding media files to a user account that can be utilized in accordance with various embodiments.

FIG. 3 illustrates a first portion 300 of an example process for scanning and matching media files that can be used in accordance with various embodiments. It should be understood that there can be additional, fewer, or alternative steps performed in similar or alternative orders, or in parallel, within the scope of the various embodiments unless otherwise stated. In this example, an indication is received 302 for a user indicating a media file to be stored to the cloud. An uploader or similar component on the computing device can analyze 304 the records (or other such information) for the media file, and can use the information in those records to generate 306 a fingerprint for the media file. In at least some embodiments, this can involve generating a cryptographic hash of information contained in a selection of the records of the media file. The uploader can also read 308 the metadata from the unprotected portion of the media file, and can cause 310 the fingerprint and metadata to be transmitted to a resource provider or cloud environment, among other such options.

Figure 4:
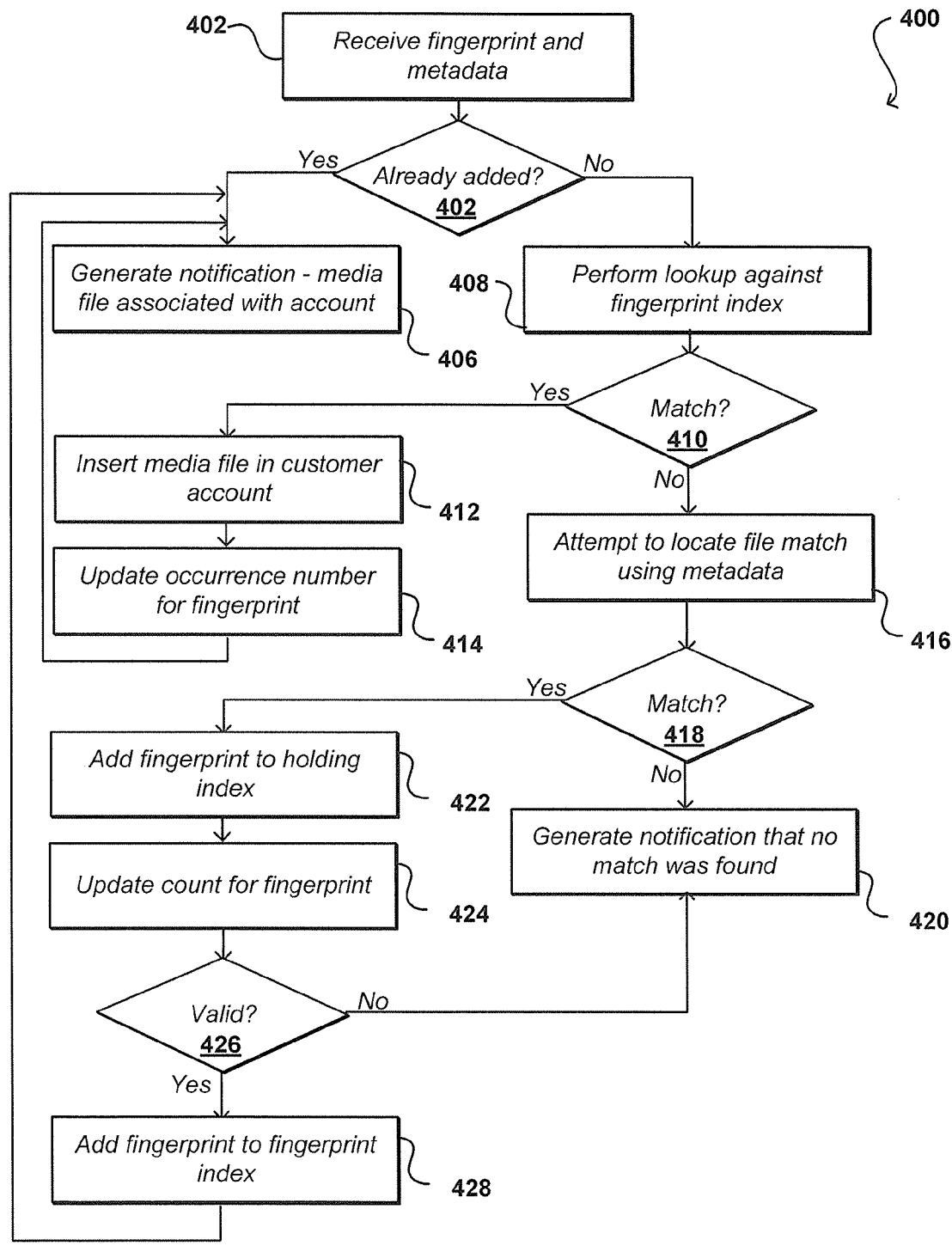
FIG. 4 illustrates an example process for building up an index of media information that can be utilized in accordance with various embodiments.

FIG. 4 illustrates a second portion 400 of the example process that can be used in accordance with various embodiments. In this portion, a fingerprint and metadata can be received 402 for a media file that a user would like to add to a user account. A determination can be made 404 as to whether this fingerprint has already been added to the customer account, or otherwise scanned for the account, and if so a notification can be generated 406 indicating that the media file has already been added to the customer account (or another such action has already occurred). Depending upon the context of the request, the notification may or may not be passed along to the user. For example, if the request was part of an automated synchronization process, there may be no reason to inform the user that the media file is already associated with a user account. If the fingerprint has not previously been scanned, a matching service or other such component can perform a look up 408 of the fingerprint in a fingerprint index. If an entry for the fingerprint is found 410 in the fingerprint index, a media file corresponding to an identifier in the index can be inserted 412 into the customer's account with the provider. A count of the number of times that fingerprint has been scanned in customer files can also be updated 414 accordingly.

If the fingerprint is not located in the fingerprint index, the metadata for the file can be used to attempt to locate 416 an identifier for a matching media file stored by the provider, such as may be stored in a catalog of media files. In some embodiments the metadata can be submitted to a matching service to attempt to locate the matching information. If no match can be located 418, a notification can be generated 420 that a match cannot be found, in which case the media file will need to be uploaded to the provider environment if the user wants the file to be available from the provider environment. If the file is in a proprietary format and no match can be located, the user might have to purchase another copy of the content in an accessible format. If a match can be located, the fingerprint can be added 422 to a set of fingerprints encountered, such as may be stored to a temporary or holding index, and the count of times that fingerprint has been encountered can be updated 424. If the fingerprint after the count update meets 426 the validity criteria, the fingerprint can be added 428 to the fingerprint index as a valid fingerprint for the matching media file identifier. As discussed, the validity criteria can include a percentage of occurrences of a fingerprint with a media file, a minimum number of occurrences, or other such information. A notification also can be generated and sent to the client device indicating that a matching media file was located, and the file was added to the client account, such that an uploading of the file is not necessary.

As discussed, in some embodiments a scanning of the various user accounts might also be performed periodically in order to ensure that valid fingerprints were used to add media content to a user's account. In some cases, the fingerprint might have been encountered only a few times, or never before, and the corresponding file might have been added to a user account in order to provide a positive user experience. If, after a number of instances of that content have been encountered, the fingerprint no longer meets the validity criteria, the file might be removed from the customer account. In some embodiments, a user might at least be notified of the issue and given an opportunity to address the issue before the file is removed. Various other remedial actions can be taken as well within the scope of the various embodiments.

It should be understood that, while files such as audio and video files encoded in the MPEG-4 file format are presented for purposes of explanation, various files of various formats can take advantage of various aspects discussed and suggested herein. These can include, for example, presentation files, electronic book content, formatted documents, and the like.

Figure 5:
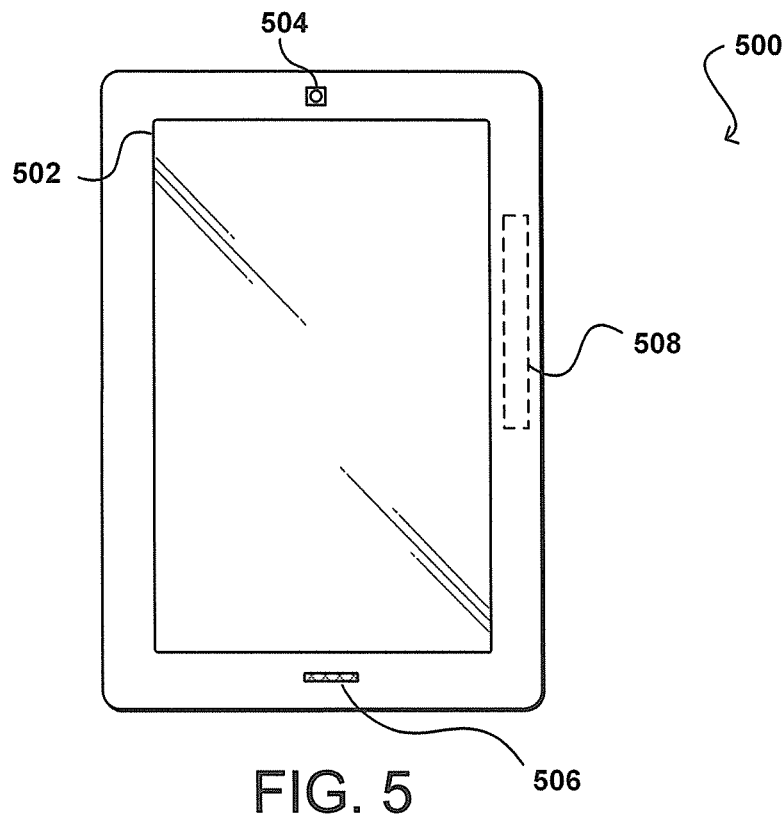
FIG. 5 illustrates an example device that can be used to implement aspects of the various embodiments.

FIG. 5 illustrates an example electronic user device 500 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 500 has a display screen 502 on the front side, which under normal operation will display information to a user facing the display screen (e.g., on the same side of the computing device as the display screen). The computing device in this example includes at least one camera 504 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. Further, each image capture element can comprise a digital still camera, configured to capture subsequent frames in rapid succession, or a video camera able to capture streaming video.

The example computing device 500 also includes at least one microphone 506 or other audio capture device capable of capturing audio data, such as words or commands spoken by a user of the device. In this example, a microphone 506 is placed on the same side of the device as the display screen 502, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc. The example computing device 500 also includes at least one networking element 508, such as cellular modem or wireless networking adapter, enabling the device to connect to at least one data network.

Figure 6:
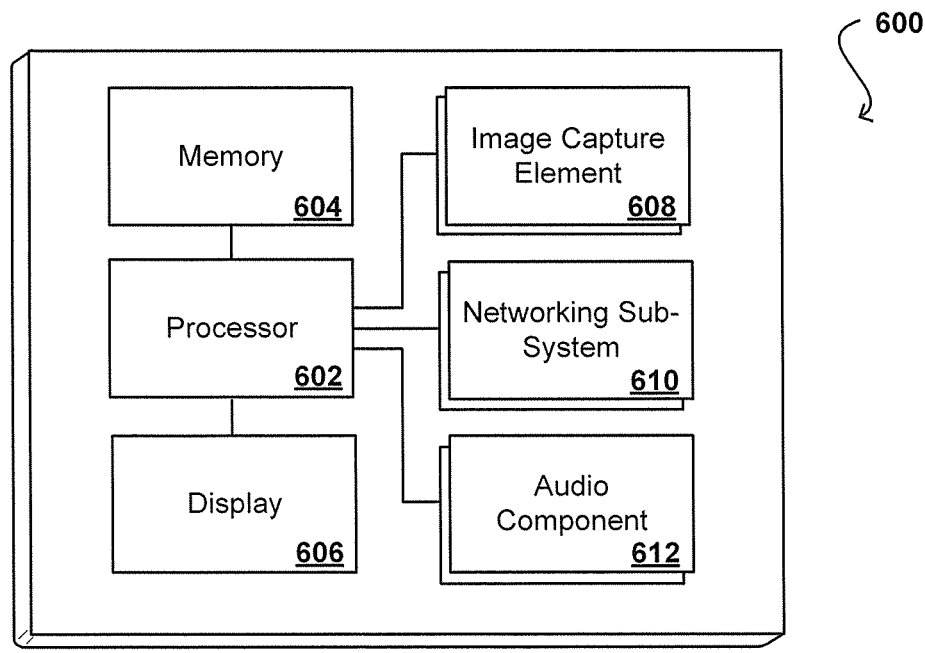
FIG. 6 illustrates example components of a client device such as that illustrated in FIG. 5.

FIG. 6 illustrates a logical arrangement of a set of general components of an example computing device 600 such as the device 500 described with respect to FIG. 5. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one image capture element 608 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio component 612, such as a mono or stereo microphone or microphone array, operable to capture audio information from at least one primary direction. A microphone can be a uni- or omni-directional microphone as known for such devices.

In some embodiments, the computing device 600 of FIG. 6 can include one or more communication elements or networking sub-systems 610, such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 600 also can include at least one orientation or motion sensor (not shown). Such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 602, whereby the device can perform any of a number of actions described or suggested herein.

As an example, a computing device such as that described with respect to FIG. 6 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

As discussed, different approaches can be implemented in various environments in accordance with the described embodiments. As will be appreciated, although a Web-based environment is used for purposes of explanation, different environments may be used, as appropriate, to implement various embodiments. A system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof.

Components used for such a system can depend at least in part upon the type of network and/or environment selected. Protocols and components for communicating via such a network are well known and will not be discussed herein in detail. Communication over the network can be enabled via wired or wireless connections and combinations thereof.

An environment can include various application servers, content servers, data stores, and other such components for service content and performing processing operations. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. An application server can include any appropriate hardware and software for integrating with a data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by a Web server in the form of HTML, XML or another appropriate structured language in this example. The handling of all requests and responses, as well as the delivery of content between a client device and an application server, can be handled by a Web server or other such component. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store can include mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the client device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1 or 2. Thus, the depiction of the systems should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
at least one processor; and
memory including instructions that, when executed by the processor, cause the computing system to:
receive a request to associate a first media file and a second media file with a user account for a content storage environment, the first media file and the second media file including one or more encrypted records preventing at least one of audio or video data of the first media file and the second media file from being validated by a system of a resource provider;
determine a first unencrypted record information between a first start section and a first end section of the first media file;
determine a second unencrypted record information between a second start section and a second end second of the first media file;
determine a first fingerprint for the first media file based at least in part on an ordering of the first unencrypted record information and the second unencrypted record information;
determine a number of occurrences of the first fingerprint;
determine that the number of occurrences meets an authenticity threshold;
determine that the first fingerprint is valid, a valid fingerprint corresponding to an authentic version of the first media file;
match the first fingerprint with a valid fingerprint of a plurality of valid fingerprints associated with a media object stored in the content storage environment;
associate the media object with the user account;
enable access to the media object from the content storage environment;
in response to determining a second fingerprint for the second media file, determine that the second fingerprint does not match one of the plurality of valid fingerprints;
add the second fingerprint to a holding index;
update a count for the second fingerprint in the holding index each time the second fingerprint is encountered for a unique copy of an associated media file; and
move the second fingerprint to an index when the count for the second fingerprint meets at least one validation criterion, wherein the at least one validation criterion includes the second fingerprint appearing for a minimum percentage of total received fingerprints for the second media file.

2. The computing system of claim 1, wherein the first media file and the second media file includes one an identifier, a security mechanism, a watermark, or information indicative of authenticity.

3. The computing system of claim 1, wherein the first fingerprint is used to assist in one of identifying the first media file or verifying an authenticity of the first media file.

4. The computing system of claim 1, wherein the instructions when executed by the processor further enable the computing system to:
determine, for a plurality of media files of the resource provider, a respective fingerprint to generate a plurality of fingerprints; and
generate an index that maps each one of the fingerprints to a corresponding one of the plurality of media files.

5. The computing system of claim 1, wherein the first media file and the second media file includes metadata, and wherein the metadata includes information for at least one of a title, an actor, an artist, an album, a track number, a chapter number, a disc number, a track duration, or a chapter duration.

6. The computing system of claim 5, wherein the instructions when executed by the processor further enable the computing system to:
compare the metadata to corresponding data in a catalog of the resource provider;
identify a corresponding media object in the catalog; and
generate an index that maps the first media file to the corresponding media object.

7. The computing system of claim 1, wherein the instructions when executed by the processor further enable the computing system to:
  authenticate a user of the user account and determine an active state of the user account before the associating.

8. The computing system of claim 1, wherein the first media file and the second media file comprises one of an audio file, a video file, an electronic book file, a gaming file, a formatted document, or a presentation file, and wherein the first media file and the second media file is formatted in an MPEG-4 format, and wherein exposed records of the first media file and the second media file include at least one stsz record.

9. A method, comprising:
  receiving a request to associate a first media file and a second media file with a user account for a content storage environment, the first media file and the second media file including one or more encrypted records preventing at least one of audio or video data of the first media file and the second media file from being validated by a system of a resource provider;
  determining a first unencrypted record information between a first start section and a first end section of the first media file;
  determining a second unencrypted record information between a second start section and a second end second of the first media file;
  determining a first fingerprint for the first media file based at least in part on an ordering of the first unencrypted record information and the second unencrypted record information;
  determining a number of occurrences of the first fingerprint;
  determining that the number of occurrences meets an authenticity threshold;
  determining that the first fingerprint is valid, a valid fingerprint corresponding to an authentic version of the first media file;
  matching the first fingerprint with a valid fingerprint of a plurality of valid fingerprints associated with a media object stored in the content storage environment;
  associating the media object with the user account;
  enabling access to the media object from the content storage environment;
  in response to determining a second fingerprint for the second media file, determining that the second fingerprint does not match one of the plurality of valid fingerprints;
  adding the second fingerprint to a holding index;
  updating a count for the second fingerprint in the holding index each time the second fingerprint is encountered for a unique copy of an associated media file; and
  moving the second fingerprint to an index when the count for the second fingerprint meets at least one validation criterion, wherein the at least one validation criterion includes the second fingerprint appearing for a minimum percentage of total received fingerprints for the second media file.

10. The method of claim 9, further comprising:
  determining, for a plurality of media files of the resource provider, a respective fingerprint to generate a plurality of fingerprints; and
  generating an index that maps each one of the fingerprints to a corresponding one of the plurality of media files.

11. The method of claim 9, wherein the first media file includes metadata, the method further comprising:
  comparing the metadata to corresponding data in a catalog of the resource provider;
  identifying a corresponding media object in the catalog; and
  generating an index that maps the first media file to the corresponding media object.

12. The method of claim 9, further comprising:
  authenticate a user of the user account and determine an active state of the user account before the associating.

13. A non-transitory computer readable storage medium storing one or more sequences of instructions executable by one or more processors to perform a set of operations comprising:
  receiving a request to associate a first media file and a second media file with a user account for a content storage environment, the first media file and the second media file including one or more encrypted records preventing at least one of audio or video data of the first media file and the second media file from being validated by a system of a resource provider;
  determining a first unencrypted record information between a first start section and a first end section of the first media file;
  determining a second unencrypted record information between a second start section and a second end second of the first media file;
  determining a first fingerprint for the first media file based at least in part on an ordering of the first unencrypted record information and the second unencrypted record information;
  determining a number of occurrences of the first fingerprint;
  determining that the number of occurrences meets an authenticity threshold;
  determining that the first fingerprint is valid, a valid fingerprint corresponding to an authentic version of the first media file;
  matching the first fingerprint with a valid fingerprint of a plurality of valid fingerprints associated with a media object stored in the content storage environment;
  associating the media object with the user account;
  enabling access to the media object from the content storage environment;
  in response to determining a second fingerprint for the second media file, determining that the second fingerprint does not match one of the plurality of valid fingerprints;
  adding the second fingerprint to a holding index;
  updating a count for the second fingerprint in the holding index each time the second fingerprint is encountered for a unique copy of an associated media file; and
  moving the second fingerprint to an index when the count for the second fingerprint meets at least one validation criterion, wherein the at least one validation criterion includes the second fingerprint appearing for a minimum percentage of total received fingerprints for the second media file.

14. The non-transitory computer readable storage medium of claim 13, further comprising instructions executed by the one or more processors to perform the set of operations of:
  determining, for a plurality of media files of the resource provider, a respective fingerprint to generate a plurality of fingerprints; and
  generating an index that maps each one of the fingerprints to a corresponding one of the plurality of media files.

15. The non-transitory computer readable storage medium of claim 13, further comprising instructions executed by the one or more processors to perform the set of operations of:
    authenticate a user of the user account and determine an active state of the user account before the associating.

\* \* \* \* \*